UNITED STATES PATENT OFFICE.

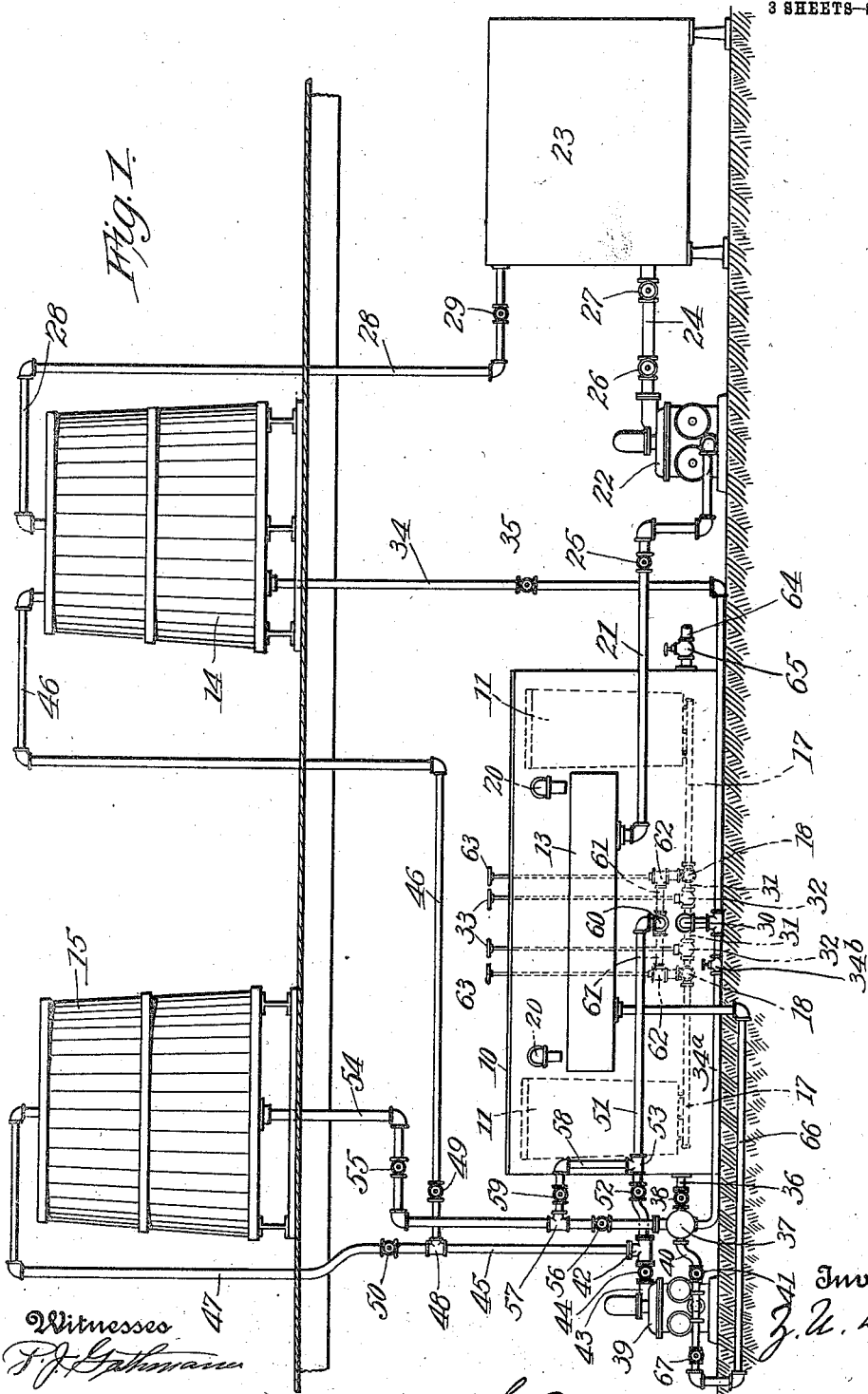

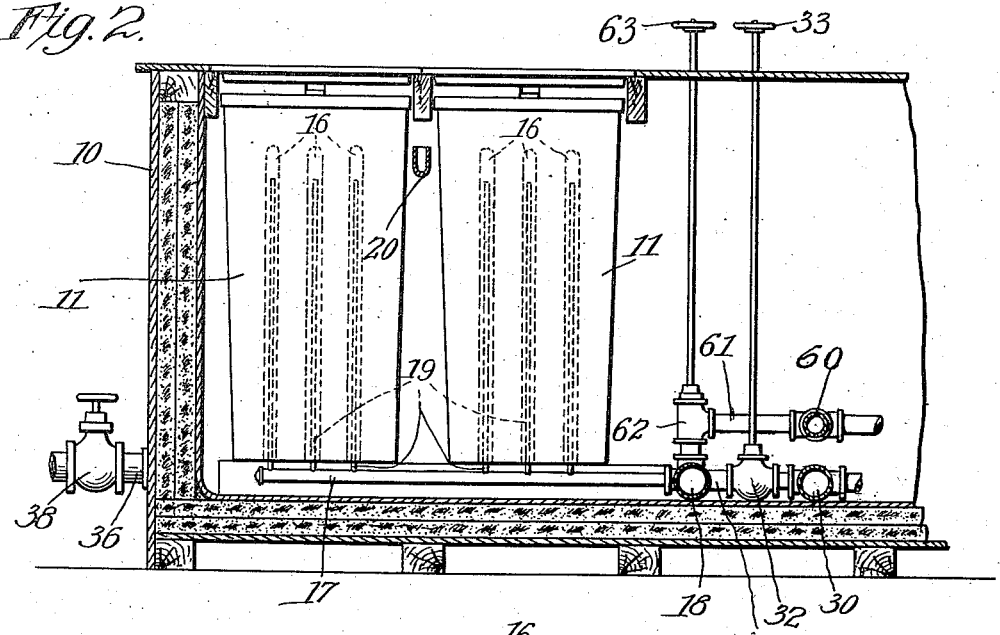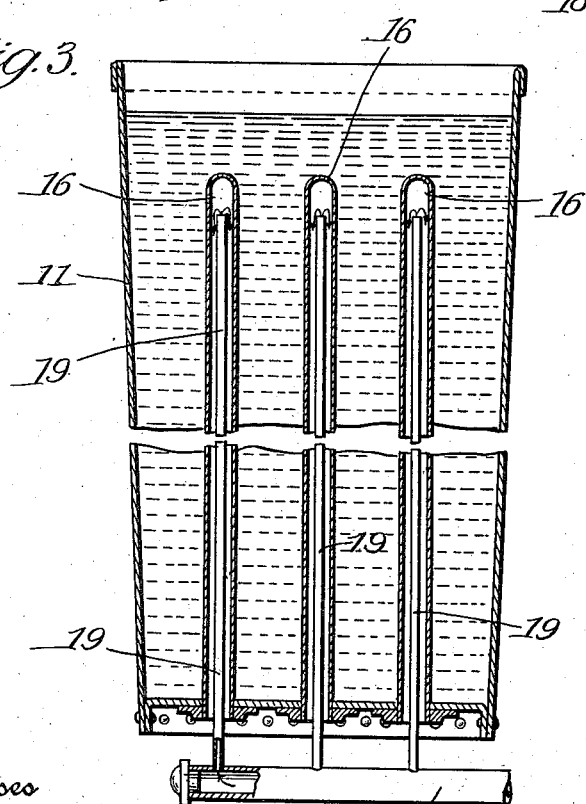

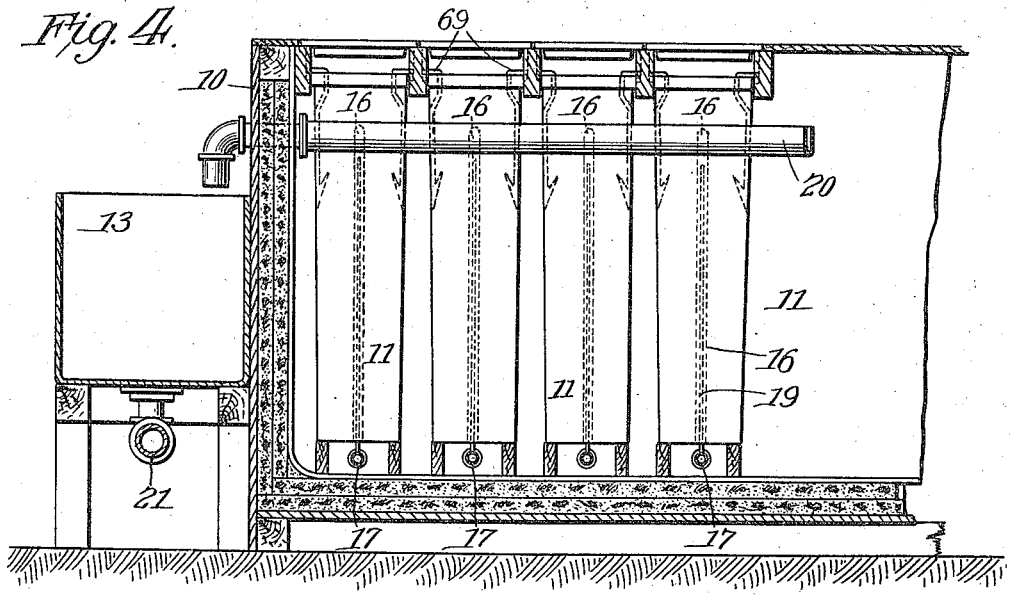
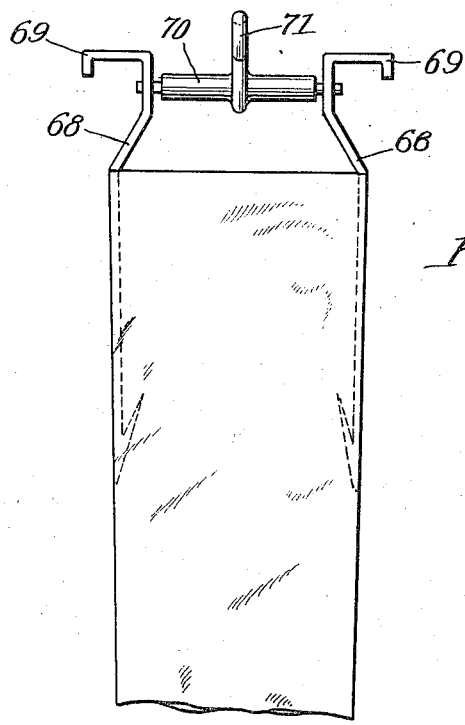

ZENAS U. DODGE, OF NEW YORK, N. Y.

APPARATUS FOR MAKING AND HARVESTING ICE.

1,066,262.  Specification of Letters Patent.  Patented July 1, 1913.

Application filed August 27, 1912. Serial No. 717,266.

*To all whom it may concern:*

Be it known that I, ZENAS U. DODGE, a citizen of the United States, and resident of New York, county and State of New York, have invented certain new and useful Improvements in Apparatus for Making and Harvesting Ice, of which the following is a specification.

This invention relates to refrigerating systems and has for its object the provision of a system which is capable of making ice rapidly and continuously and which is simple in construction and operation.

The novel features of the invention will be apparent from the following description, taken in connection with the accompanying drawings which illustrate one form of apparatus for carrying out my improved method.

In the drawings, Figure 1 is a diagrammatic view of the preferred form of apparatus for carrying out my improved method of making ice; Fig. 2 is an enlarged section of a part of the freezing tank; Fig. 3 is a transverse section through one of the water cans showing the arrangement of the brine circulating pipes; Fig. 4 is a transverse section through the freezing tank, this view being taken on a plane at right angles to that shown in Fig. 2; Fig. 5 is a view of a block of ice showing the lifting hooks attached thereto.

Referring to the drawings, 10 indicates a freezing tank in which are arranged the water receptacles or cans 11, these cans being, for the purposes of my invention, preferably fixed in the freezing tank. Arranged alongside of the freezing tank 10 is an overflow tank 13 and above the freezing tank are arranged the storage tanks 14 and 15, the tank 14 containing the cold brine or freezing liquid and the tank 15 containing the hot brine or thawing liquid.

Projecting upwardly from the bottom of each of the water cans are pipes 16 having their upper ends closed and their lower ends open. Arranged below the water cans are headers 17 which are connected with supply headers 18. Extending upwardly from the headers 17 are the pipes 19 which are arranged within the pipes 16 and have their upper ends open whereby the freezing or thawing liquid is adapted to circulate from the headers 17 upwardly through the pipes 19 and downwardly through the pipe 16 and be discharged into the freezing tank 10.

Extending across the freezing tank 10 at a level slightly above the level of the water in the cans 11 are overflow gutters 20 which discharge into the overflow tank 13. A pipe 21 is connected with the tank 13 and leads to the inlet of a brine circulating pump 22 which discharges the brine into a refrigerating apparatus 23 by means of a pipe 24. The refrigerating apparatus 23 may be of any suitable type adapted to reduce the temperature of the cold brine or freezing liquid. A valve 25 is arranged in the pipe 21 and valves 26 and 27 are arranged in the pipe 24. From the refrigerating apparatus 23 the brine passes to the storage tank 14 by means of a pipe 28 in which is arranged a valve 29.

The headers 18 are connected with a cold brine header 30 by means of pipes 31 in which are arranged the valves 32, these valves being provided with operating stems 33, whereby they may be operated from the top of the freezing tank 10. A pipe 34 leads from the bottom of the storage tank 14 to the header 30 and is provided with a valve 35.

For the purpose of withdrawing the brine from the freezing tank 10 I have provided the latter with a discharge pipe 36 which leads to a header 37 and is provided with a valve 38. For the purpose of filling the freezing tank 10 with cold brine, a pipe 34ª leads from the pipe 34 to the header 37 and is provided with a valve 34ᵇ. A pump 39 has its inlet connected with the header 37 by means of a pipe 40 which has a valve 41 arranged therein. The discharge side of the pump 39 is connected with a T 42 by a pipe 43 having a valve 44. A pipe 45 communicates with one outlet of the T 42 and is connected with pipes 46 and 47 by means of a T 48. The pipe 46 is provided with a valve 49 and the pipe 47 with a valve 50. A pipe 51 is connected with the T 42 and has arranged therein a valve 52 and a T 53. The pipe 46 discharges into the cold brine storage tank 14 and the pipe 47 discharges into the hot brine storage tank 15. From the bottom of the latter extends a pipe 54 which is connected with the header 37 and has arranged therein the valves 55 and 56 and a T 57 between these valves. A pipe 58 connects the T's 53 and 57 and is provided with a valve 59. The pipe 51 leads from the T 42 to the hot brine header 60 and the latter is connected with the headers 18 by pipes 61 having arranged therein the angle valves 62, these valves being provided with operating stems 63 whereby they may be operated from the top of the freezing tank. The tank 10 may also be provided with a discharge pipe 64 having a valve 65 arranged therein. A pipe 66 extends from the bottom of the overflow tank 13 to the inlet of the pump 39, whereby the overflow liquid may be withdrawn by means of this pump. The pipe 66 is controlled by a valve 67.

The operation of the system is as follows: Assuming that the cans 11 are filled with water to be frozen and that the tanks 14 and 15 are filled with the cold and hot brine respectively and all of the valves of the system closed, the freezing tank 10 can be filled with cold brine to the level of the gutters 20 by opening the valves 35, 34ᵇ and 38, thus permitting the cold brine to flow from the tank 14. When the tank 10 is filled the valves 34ᵇ and 38 are closed and the valves 32 are opened. The cold brine will then flow to the headers 17 and from the latter through the pipes 19 and 16 into the tank 10 and from the latter overflow into the gutters 20 and the tank 13. By starting the pump 22 and opening the valves 25, 26, 27 and 29 the cold brine which overflows from the tank 10 into the tank 13 will be pumped from the latter through the refrigerating apparatus 23, where its temperature will be reduced, and from the latter through the pipe 28 to the storage tank 14. It will thus be seen that a circulation of cold brine through the system may be maintained by means of the pump 22, the water in the cans 11 being cooled by the brine owing to the circulation through the pipes 16 and 19 and to the cans being surrounded by the brine in the tank 10.

When the water in the cans 11 has been frozen the valves 32 are closed and the circulating pump 22 stopped, thus interrupting the flow of cold brine. The pump 39 is then started and the valves 38, 41, 44, 49 and 67 opened thus permitting the pump 39 to withdraw the cold brine from the tanks 10 and 13 and discharge the same into the tank 14. When all of the cold brine has been withdrawn from the tanks 10 and 13 the pump 39 is stopped, the valves 41 and 49 closed and the valves 55 and 56 opened, thereby permitting the hot brine to flow through the pipe 54, the header 37 and the pipe 36 into the tank 10. When the tank 10 has been filled to the level of the gutters 20 and the hot brine overflows into the tank 13, the valves 38 and 56 are closed and the valves 59 and 62 are opened, thereby permitting the hot brine to circulate through the pipes 51 and 58 and the headers 17 into the pipes 16 and 19, and thaw the ice surrounding the latter. I prefer to fill the tank 10 with the hot brine before circulating the same through the pipes 16 and 19 owing to the fact that the ice surrounding the latter thaws more rapidly than that in contact with the sides of the can and therefore in order to avoid making large holes in the ice I first fill the tank 10 so that the ice at the sides of the can will have a longer time to thaw than that surrounding the pipes and will be freed from the can by the time it is freed from the pipes 16. The hot brine which overflows into the tank 13 is returned through the pipe 47 to the tank 15 by means of the pump 39. For this purpose the valves 44, 50 and 67 are opened. When the ice has been thawed sufficiently to permit its removal from the cans, the circulation of the hot brine is interrupted by closing the valves 56, 59 and 62. Any suitable means may be provided for withdrawing the ice from the cans and for this purpose I prefer to use the hooks 68 which are provided with the bent arms 69 adapted to engage the upper edge of the cans and support the hooks. A lifting bar 70 is secured to the upper ends of the hooks 68 and is provided with a ring or hook 71 to which a crane hook may be attached for the purpose of lifting the ice. As shown in Fig. 5, the lower portions of the hooks 68 are frozen into the ice at the sides of the ice block and when the ice has been removed from the can these hooks may be readily detached. The pump 39 is employed to return the hot brine in the tank 10 to the tank 15 and for this purpose the valves 38 and 41 are opened. When all of the hot brine has been withdrawn from the tanks 10 and 13, the valves 41, 50, and 67 are closed and the pump 39 stopped. The cans 11 are then filled with fresh water and the cycle of operations just described repeated.

It will be obvious to those skilled in the art that various changes may be made in the minor details of the apparatus which I have shown within the scope of the appended apparatus claims and also that my improved method may be carried out by other forms of apparatus than that shown and therefore I do not wish to be limited to the precise details shown and described.

Having thus described my invention what I claim and desire to secure by Letters-Patent, is,

1. In ice making apparatus, the combination of a freezing tank, water receptacles arranged in said tank, an overflow for said tank, a freezing liquid supply, means whereby the freezing liquid is circulated from said supply through said tank and the overflow from the latter, means for returning freezing liquid from said overflow to said supply, means for reducing the temperature of the freezing liquid between the overflow and the supply, and means independent of said overflow whereby the freezing liquid may be withdrawn from said tank and returned to said supply.

2. In apparatus for making ice, the combination of a freezing tank, water receptacles arranged in said tank, an overflow from said tank, a freezing liquid supply tank arranged above the freezing tank, a pipe connecting said tanks and adapted to convey the freezing liquid from the supply tank to the freezing tank, means for conveying the freezing liquid from said overflow to said supply tank, means for reducing the temperature of the freezing liquid, means for supplying a thawing liquid to said freezing tank, and means independent of said overflow for withdrawing liquid from the freezing tank and adapted to deliver the same either to the freezing liquid supply tank or the thawing liquid supply.

3. In apparatus for making ice, the combination of a freezing tank, water receptacles arranged in said tank, an overflow for said tank, a freezing liquid supply, circulating pipes arranged in said water receptacles, means for conveying the freezing liquid from said supply to said freezing tank and said circulating pipes, means for returning the freezing liquid from said overflow to said supply, means for reducing the temperature of the freezing liquid, a thawing liquid supply, means for conveying the thawing liquid to said circulating pipes and said freezing tank, and means independent of said overflow for withdrawing liquid from said freezing tank and adapted to deliver the same to said supplies.

4. In apparatus for making ice, the combination of a freezing tank, water receptacles arranged in said tank, an overflow for said tank, a freezing liquid supply, circulating pipes arranged in said receptacles, and extending upwardly from the bottom thereof and discharging into the space surrounding the receptacles, means for conveying the freezing liquid from said supply directly to said freezing tank or through said circulating pipes, means for returning the freezing liquid from said overflow to said supply, means for reducing the temperature of the freezing liquid, a thawing liquid supply, means for conveying the thawing liquid directly to said freezing tank or through said circulating pipes, and means, independent of said overflow for withdrawing liquid from said freezing tank and adapted to deliver the same to either of said supplies.

5. In apparatus for making ice, the combination of a freezing tank, water receptacles arranged in said tank, an overflow for said tank, a freezing liquid supply tank arranged above said freezing tank, circulating pipes arranged in said receptacles, and extending upwardly from the bottom thereof and discharging into the space surrounding the receptacles, pipes for conveying the freezing liquid from said supply tank directly to said freezing tank or through said circulating pipes, means for returning the freezing liquid from said overflow to said supply tank, means for cooling the freezing liquid before it is returned to said supply tank, a thawing liquid supply tank arranged above said freezing tank, pipes for conveying the thawing liquid directly to said freezing tank or through said circulating pipes, and means independent of said overflow for withdrawing liquid from said freezing tank and adapted to deliver the same to either of said supply tanks.

In testimony whereof I affix my signature in presence of two witnesses.

ZENAS U. DODGE.

Witnesses:
RUSSELL BUNCE,
WM. R. WARNER.